R. G. CROSBIE.
APPARATUS FOR USE IN MAKING BOXES, CRATES, AND THE LIKE.
APPLICATION FILED FEB. 18, 1920.

1,388,408.

Patented Aug. 23, 1921.

Inventor
R. G. Crosbie,
By H. R. Kerslake
Attorney

R. G. CROSBIE.
APPARATUS FOR USE IN MAKING BOXES, CRATES, AND THE LIKE.
APPLICATION FILED FEB. 18, 1920.

1,388,408.

Patented Aug. 23, 1921.

Inventor
R. G. Crosbie,
By H. R. Kerslake
Attorney

R. G. CROSBIE.
APPARATUS FOR USE IN MAKING BOXES, CRATES, AND THE LIKE.
APPLICATION FILED FEB. 18, 1920.
1,388,408.
Patented Aug. 23, 1921.
8 SHEETS—SHEET 6.
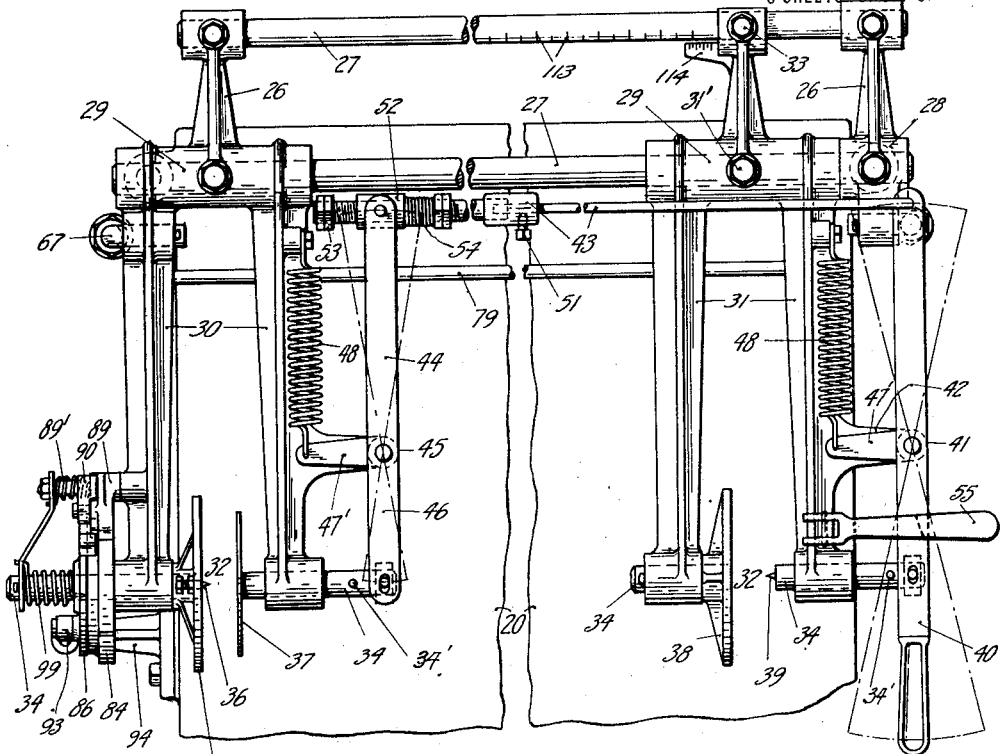
Inventor
R. G. Crosbie
By L. R. Kerslake
Attorney R. G. CROSBIE.
APPARATUS FOR USE IN MAKING BOXES, CRATES, AND THE LIKE.
APPLICATION FILED FEB. 18, 1920.

1,388,408.

Patented Aug. 23, 1921.
8 SHEETS—SHEET 8.

Inventor
R. G. Crosbie,
By H. R. Kerslake.
Attorney

UNITED STATES PATENT OFFICE.

ROBERT GEORGE CROSBIE, OF HAWTHORN, VICTORIA, AUSTRALIA, ASSIGNOR TO THE CASE MAKING MACHINE COMPANY LIMITED, OF MELBOURNE, AUSTRALIA.

APPARATUS FOR USE IN MAKING BOXES, CRATES, AND THE LIKE.

1,388,408.     Specification of Letters Patent.     Patented Aug. 23, 1921.

Application filed February 18, 1920. Serial No. 359,616.

*To all whom it may concern:*

Be it known that I, ROBERT GEORGE CROSBIE, a subject of the King of Great Britain, residing at 523 Burwood Road, Hawthorn, in the State of Victoria, Commonwealth of Australia, have invented certain new and useful Improved Apparatus for Use in Making Boxes, Crates, and the like, of which the following is a specification.

This invention relates to an improved apparatus for use in making boxes, crates, cases and the like made of boards or laths of wood or similar material and in this specification the term "box" will include any such receptacle to which the invention is applicable.

This invention relates to apparatus for use in making boxes in which a pair of synchronously operable arms adjustably spaced apart are employed moving in parallel planes above a fixed horizontal work table. Each of these arms carries at its outer or free end a pair of gripping devices for the ends so arranged that the latter may be partially rotated whereby the several edges of the same are conveniently and successively positioned for the ready attachment of the sides of the box.

The object of this present invention is to provide *inter alia* certain mechanical means for—

(1) Insuring that the turning of the end pieces one quarter of a revolution (or more or less according to the number of sides of the box) shall be positive on each operation.

(2) Adjusting the relative positions of the chucks and a movable stop whereby when they are once adjusted they may be operated simultaneously or independently to grip ends of a particular size in the same position and thereby insure symmetry of form in the boxes being manufactured.

(3) Locking, unlocking and partially rotating the chucks and maintaining the end pieces parallel with the table while held in the chucks and being raised and lowered.

(4) Effecting an automatic adjustment of the chucks to insure end pieces of different lengths or irregularly spaced ends being placed correctly on the table.

(5) Adjusting the alinement of the chucks.

(6) Forcibly closing and maintaining a constant closing pressure on the opening and closing members of the chucks to securely hold the end pieces and also for exerting a frictional resistance to the turning movement of the chucks whereby the ends will be maintained in correct relationship to the said chucks.

For the purposes of convenience in the description of the invention as hereinafter set out certain terms are employed which it will be understood are intended to be read as embracing their equivalents.

In this specification—

The term "box" will include a crate, case or other receptacle made of boards or laths to which the invention is applicable.

The term "chuck" will include any pair of gripping members one or both of which may be movable endwise and may comprise face plates or plungers or the combination of a face plate and a plunger or center.

The term "table" or "nailing table" will include a bench or other support upon which the end pieces are placed while the side and bottom boards are being nailed thereon to form a box.

The appended drawings depict a practical application of the above recited novel structural features and their functions, it being understood, however, that this illustrated and hereinafter described embodiment is not to be regarded as delimiting the scope of the concluding claiming clauses.

In these drawings—

Fig. 9 is a view in plan illustrating slight modifications in the means devised for controlling the chucks.

Fig. 10 is a view in perspective of a detachable arm and chuck for supporting a division piece on the table.

Fig. 16 is a diagrammatic view illustrating a feature of construction devised to permit of the chuck carrying arms automatically adjusting themselves to suit ends of different widths and lengths.

Figure 1:
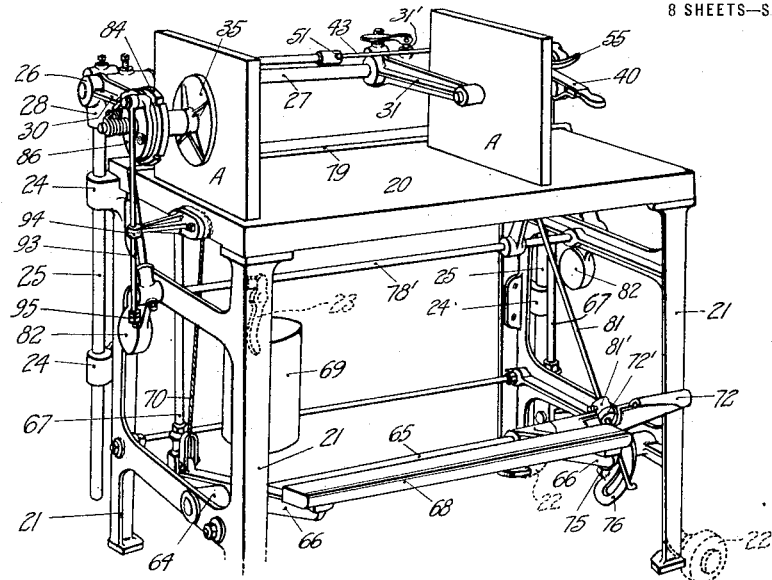
Figure 1 is a view in perspective of a machine constructed in accordance with the present invention showing a pair of end pieces for a box supported in position for nailing the side boards thereto.

The reference numeral 20 designates a table supported on four or more legs 21 which are braced by stays, brackets or the like to insure rigidity of construction. In order to facilitate the transport of the machine from place to place the legs 21 at one end of the machine may be fitted with suitable wheels 22 and the legs or other part of the frame or table at the opposite end can be fitted with a pair of fixed or pivoted drop handles 23, shown in dotted lines in Fig. 1.

The table is provided with bearings 24 in which are adapted to slidably support the vertical side members 25 of an open frame 26 the horizontal members 27 of which are connected to the said vertical members by castings 28 or in any other approved way. The frame 26 is rigid in construction and to the forward horizontal member 27 is fitted a pair of bosses 29 each having a pair of forwardly projecting arms 30 and 31 adapted to support chucks 32 on their forward ends. In lieu of mounting the side members 25 slidably in the bearings 24 they may be fitted to and project above the table and the horizontal members supporting chuck carrying arms 30 and 31 can be slidably mounted on the said side members.

The pair of arms 30 on one side of the apparatus are fixedly secured to the horizontal members 27 of the frame 26 (that is to say they are not free to slide on the said horizontal members) and the pair 31 on the opposite side of the apparatus are adjustably secured to the said horizontal members so as to permit of the chucks 32 thereon being placed nearer to or farther from the chuck on the arms 30 to suit the particular size of box being made. The rear ends of the arms 31 are provided with vertically disposed set-screws 33 (see Fig. 5) by means of which the said arms can be rocked slightly on the forward horizontal bar 27 to raise or lower the chuck to place them in correct alinement with the chuck on the arms 30. The forward ends of each pair of arms 30 and 31 are formed with bosses which are adapted to receive spindles 34 for carrying the chuck members.

The chuck members may comprise face plates or disks and centers or other approved form of gripping members to suit particular requirements or material to be gripped by the same, and the spindles carrying the said members may be arranged to be moved outwardly to open the chucks by operating a lever. A constant inward pressure is exerted on the said movable chuck members by means of a suitably arranged spring or springs and when the lever is released the spindles supporting the said members are forced inwardly with a quick thrust.

The spindle 34 in the outer fixed arm 30 is provided on its inner end with a face plate 35 having fixed or adjustable gripping spikes 36 and the opposing end of the adjacent spindle is fitted with a disk 37 which is forced to bear against the inside of an end piece placed between the chuck members by means of spring pressure. The spindle carrying the disk 37 is movable endwise but does not rotate in its bearing on the inner fixed arm 30.

The disk 37 is formed of thin spring steel so that it will yield sufficiently under the end pressure on the spindle to insure its whole surface bearing against an end piece formed with a tapering or uneven face.

The spindle 34 in the inner adjustable arm 31 is fitted with a rotatable face plate 38 and the opposing end of the adjacent spindle is formed with a centering point 39 which is adapted to be forced into the end piece of a box.

The disk 37 can be made of less diameter than the distance between the spikes 36 or it can be provided with holes (not shown) into which the said spikes are adapted to pass when the chuck is closed. The face plate 38 can be formed with a centrally disposed hole or recess (not shown) to receive the center point 39 and prevent injury to the same.

The stop pins 34' (see Fig. 9) may be fitted to the sliding spindles 34 in such positions that they will abut against the arms and prevent the chucks being closed sufficiently to cause injury to the spikes 36 or to the center 39.

While the construction and arrangement of gripping members above described will be found highly satisfactory for correctly holding the end pieces of a box it will be understood that various modifications and alterations may be made therein to suit particular requirements.

The spindles 34 on the corresponding sides of the two pair of arms 30 and 31 or the spindle on one side of one pair of arms and both spindles on the other pair of arms may be moved endwise in one direction by the operation of spring controlled cam-levers and suitable connecting devices and in the opposite direction by the spring or springs acting on the said levers and connecting devices.

Figure 3:
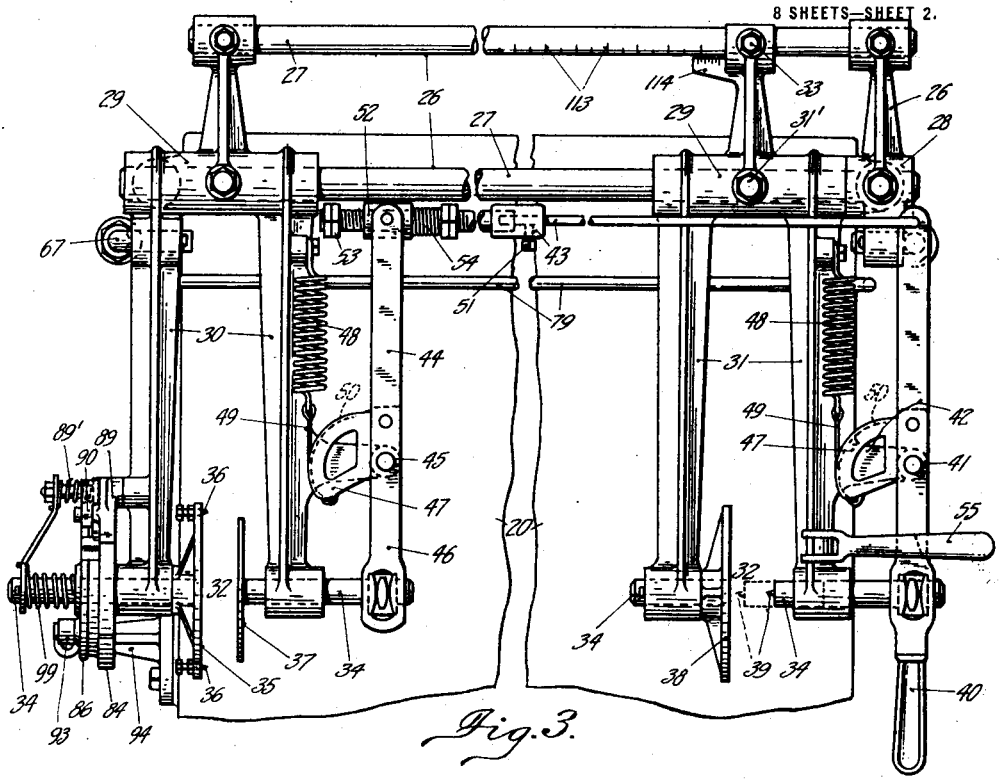
Fig. 3 is a view in plan of the machine, part of the table being shown broken away for convenience of illustration.

In the form of construction shown clearly in Fig. 3 of the drawings the right hand end of the spindle 34 in the outer adjustable arm 31 is loosely connected to an operating arm 40 on a cam lever 41 which is pivoted to a bracket 42 on the outer arm 31 and a rearwardly projecting end of the said operating lever is connected by an adjustable rod 43 to an arm 44 on a cam-lever 45 pivoted to a bracket on the inner fixed arm 30 on the opposite side of the machine. A forwardly projecting arm 46 on the said second pivoted lever 44 is connected loosely to the outer end of the spindle 34 carried by the inner fixed arm 30. The levers 41 and 45 pivoted to the fixed and adjustable arms 31 and 30 respectively are formed with laterally projecting cam-shaped members 47 which are connected by springs 48 and flexible members 49 to studs or the like on the said arms or other part of the machine, and the said springs are arranged to keep an inward pressure on the right hand chuck spindles. In the construction shown in Fig. 3 the spindle 34 in the left hand side of each chuck is capable of rotation but is incapable of any end movement.

The flexible members are connected to lugs on the forward parts of the cam-shaped members 47 and the outer faces of the said cam-shaped members are provided with grooves 50 to take the said flexible members when the levers are operated to move the chuck spindles.

In a modification of the invention (see Fig. 9 of the drawings) arms 47' are formed on the levers 41 and 45 in lieu of the cam-shaped members 47 and these arms are connected directly to the forward ends of the springs 48.

The adjustable connecting rod 43 may be made in two parts the inner ends of which are slidably or telescopically connected as shown in Fig. 3 and fastened by means of a set screw 51 or the like device.

The rear end of the spring actuated lever 45 on the fixed pair of arms 30 is pivoted loosely on a sleeve 52 which embraces the adjustable rod and bears at one side against lock nuts 53 and at the other side against a compression spring 54 mounted on the rod. The object in forming the connections between the said levers 41 and 45 and adjustable rod 43 as above described is to permit of the connected spindles 34 operating with a degree of independence that will permit of both gripping members working satisfactorily when the end pieces of a box varying in thickness and to facilitate the adjustment of the parts as will be hereinafter described.

The spindles 34 on the right hand side of each pair of gripping members are moved to open the chucks by thrusting the operating arm 40 of the cam-lever 41 outwardly until a gravity pawl 55 pivoted to the outer adjustable arm 31 falls into position to retain the said operating lever and connected parts in their open positions. The end pieces A of a box are then inserted between the gripping members of the chucks and the gravity pawl 55 is raised by hand to release the arm 40 of the operating lever 41 to allow the right hand gripping members to be forced inwardly by the springs 48 with sufficient force to cause the gripping spikes 36 and center 39 to be driven into the said end pieces A. The spikes 36 and center 39 and the pressure exerted on the right hand spindles 34 of the chucks by means of the springs 48 insure the end pieces being gripped firmly during the whole operation of forming a box.

In order to remove a finished box from the chucks the lever 41 is operated to move the right hand spindles 34 to the right until the said lever is engaged by the pawl 55 when the box is pushed sidewise to clear the spikes 36 and then lifted clear of the machine.

Figure 4:
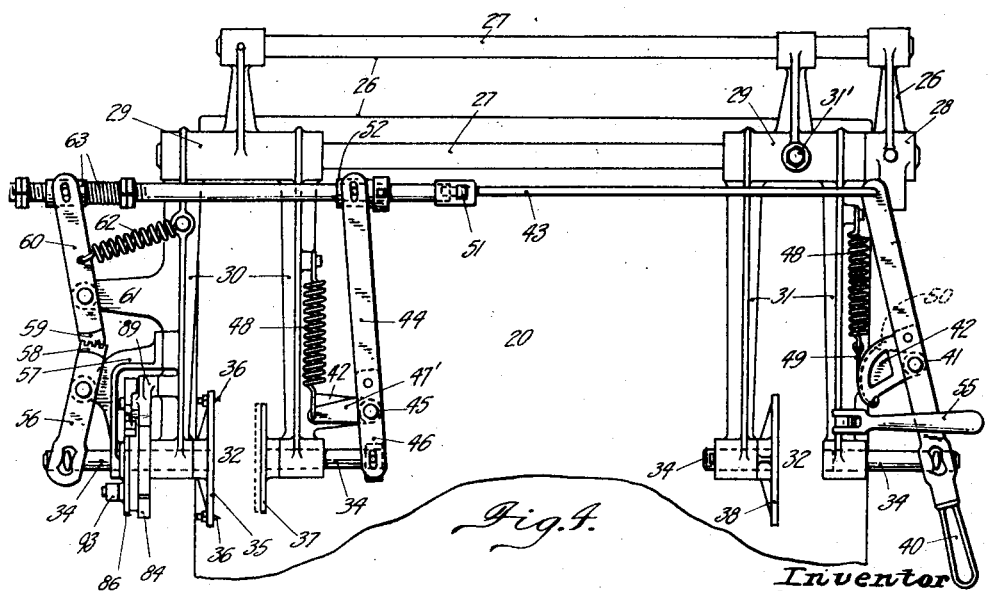
Fig. 4 is a view in plan showing a slight modification in the devices for controlling the chucks for holding the end pieces of a box.

The spindle 34 on the left hand side of the fixed pair of arms 30 may be arranged to move endwise in opposition to the movement of the spindle on the opposite arm. This form of construction is illustrated in Fig. 4 of the drawings and the said spindle is connected loosely to the forward end of an oscillating lever 56 which is pivoted to a bracket 57 on the outer fixed arm 30 and has its rear end provided with a segment 58 which gears with a like segment 59 on the forward end of a spring actuated lever 60 which is pivoted at a point between its ends to a bracket 61 formed on the said fixed arm. The spring 62 acting on the rear lever 60 is arranged in such a way that it exerts an inward pressure on the spindle of the outer chuck member and when the gravity pawl 55 is released the spring 62 forces the said spindle smartly inward in opposition to the movement of the opposing spindle carrying the non-rotatable disk 37.

When the spindle on the outer fixed arm 30 is arranged to move endwise as above described a loose connection 63 is provided between the spring actuated lever 60 and the adjustable rod 43 for permitting an independent movement of the said spindle in the manner and for facilitating adjustment as hereinbefore described.

A feature of the construction and operation of the chucks shown in Fig. 4 of the drawings is the mechanical stripping action of the spiked gripper to release the ends of a completed box when the lever 41 is operated to open the said chucks. In order to comprehend this stripping action it must be remembered that the end boards of the finished box are connected securely by the side and bottom boards and that the face plate 38 is not capable of end movement and that therefore the retraction of the center 39, the brake disk 37 and spiked face plate 35 by the movement of their spindles 34 through the operation of the lever 41 causes the said center 39 and the spikes 36 to be withdrawn or stripped from the ends of the box thereby leaving it quite free to be lifted from the machine. The movement of the spindle 34 carrying the brake disk 37 is just sufficient to give clearance for the convenient removal of the box.

The lower part of the frame of the table is provided on its sides with bearings 64 which are adapted to support a transverse shaft 65 carrying treadle levers 66 having suitable connections such as rods 67 with the vertically movable frame 26. The front or operating portions of the treadle levers 66 are connected by a foot piece 68 upon which the operator places his foot and thrusts downwardly to raise the arms 30 and 31 and the chucks supported thereby. The connecting rods 67 are set at such an angle that when an upward thrust is applied thereto the overhanging strain of the chucks and ends or partially formed box B (see Fig. 2) supported by the same will be effectually counterbalanced and the uprights 25 will move freely in the bearings 24. The said levers 66 or the arms are provided with an adjustable counter balance weight 69 to facilitate the raising of the said arms.

The counterbalance weight 69 is connected to one end of a flexible member as a rope or chain 70 which passes over a pulley 71 carried by brackets fitted to the underside of the table and has its opposite end secured to one of the levers 66. In lieu of employing the counterbalance weight 69 to facilitate the raising of the frame and attached parts I may substitute a spring therefor and arrange it in any approved way.

In order to insure symmetry of form in the boxes being made it is essential that the end pieces A should be gripped accurately in the chucks and to effect this object means are provided for simultaneously placing the chucks in their correct vertical positions and for bringing an adjustable stop into position on the top of the table to limit the rearward movement of the said end pieces whereby when the chuck levers are released the said chucks will grip the ends in such a position that they may be rotated to bring them into position for securing the sides and bottom correctly thereon.

Figure 2:
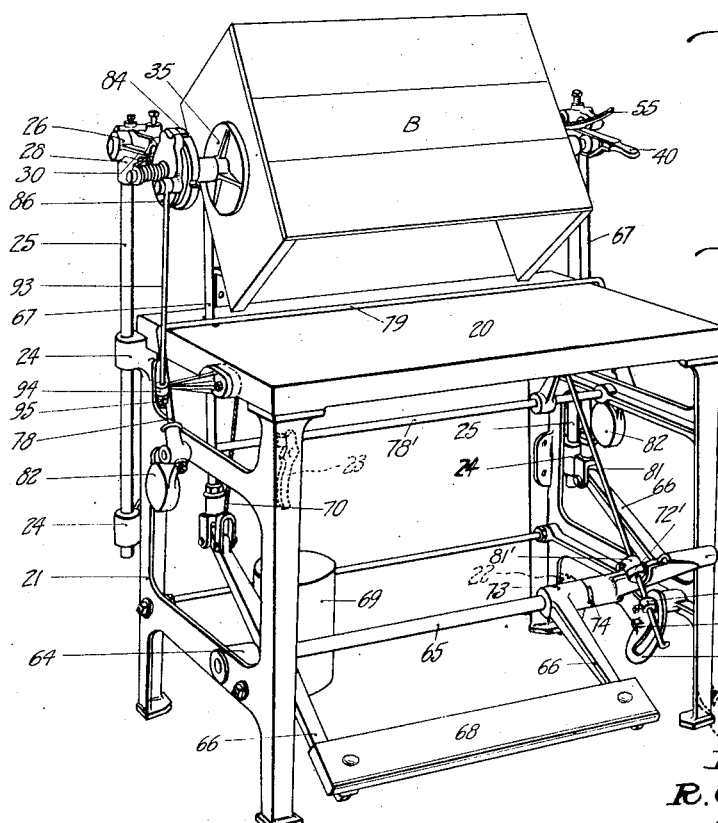
Fig. 2 is a view similar to Fig. 1 showing the operative parts of the machine in position when a partially formed box is raised and is in the act of being turned and prior to being lowered on to the table for nailing the bottom boards to the end pieces.

The means devised for effecting the above-mentioned object comprises a foot operated lever 72 having a boss which is pivoted to the shaft 65 supporting the operating treadle levers 66 and has a loose engagement with a boss 73 on the adjacent treadle lever as shown at 74 in Fig. 2 of the drawings. The connection between the bosses on the levers 66 and 72 provides for sufficient lost motion to enable the stop 79 to be moved across the table upon the operation of the foot lever 72 without causing any movement of the lever 66 and consequently the arms 30 and 31.

The bosses on the foot lever 72 and on the adjacent treadle lever 66 respectively are made in the form of loose clutch members and they may be so arranged that the depression of the said foot lever 72 will place the stop and the chuck members simultaneously in position to correctly locate and grip the end pieces of a box. When the foot lever 72 is depressed it strikes against an abutment member 75 formed on a slotted quadrant 76 which is pivotally mounted on the frame and secured fixedly thereto in any desired position by means of a bolt 77. The adjustable stop is set to determine the amount of movement capable of being imparted to the foot lever and consequently the parts attached thereto.

The stop for determining the position of the end pieces on the table comprises a pair of arms 78 which are fitted to the ends of a rocking shaft 78' passing transversely through the frame below the table and the said arms are formed integrally with or are fitted to a stop bar 79 disposed transversely above the table.

The pivoted arms 78 are of equal length and therefore as they are swung forwardly and rearwardly the rod 79 is retained at right angles to the side edges of the table and parallel with the axes of the chucks at all parts of its movement. The end of the shaft 78' at a point above the foot lever 72 is provided with a short arm 80 which is connected by an adjustable rod 81 to a forward part of the foot lever 72 in such a way that when the said lever is depressed to raise the arms and chucks the stop bar 79 on the arms 78 is moved forwardly over the table.

The lower end of the rod 81 passes through a swivel lug 72' on the side of the foot lever 72 and is fitted with an adjustable collar 81' on each side of the said lug. The said collars can be positioned on the rod 81 so that the movement of the stop bar 79 can be controlled as desired by operating the foot lever.

The stop mechanism is provided with suitably arranged counter weights 82 and 82' or springs for returning these parts to their normal or inoperative positions when the operator removes his foot from the said lever. The counter weight 82' comprises an inward extension of the foot lever 72 and this said extension is made sufficiently heavy to overbalance the front end and parts connected thereto.

The rod 81 connecting the stop mechanism to the foot lever and the abutment member 75 on the slotted quadrant 76 can be adjusted so that when the operator depresses the foot lever the chucks and the stop bar 79 will be simultaneously brought into correct positions with ease and convenience.

By adjusting the collars on the rod 81 the foot lever 72 can be arranged to move the stop bar 79 any required distance over the table without raising the chuck carrying arms as when the chucks are not required to be raised to correctly grip the narrow end pieces of a box of greater depth than width or the said lever can be arranged to operate the chuck carrying frame without moving the stop.

In order to permit of the elevation of the chucks without moving the stop bar the lower collar 81' on the bar 81 is loosened and allowed to fall into an inoperative position on the said bar so that when the foot lever 66 is operated the chucks will be raised to a desired height and the stop bar will remain in its normal position.

In chucking ends of boxes of greater width than depth the chucks and stop bar are adjusted simultaneously in order to place the chucks in position to grip the ends at a desired height and the stop bar in position so that it will locate the ends in their correct horizontal positions on the table.

Since the chucks are raised to correctly grip ends of greater width than depth it follows that when the ends are turned over and lowered onto the table the chucks will be nearer the table than when set to grip the ends placed upright on the table and that the rear edge of the said ends will now be located behind the setting position of the stop bar.

In order to provide clearance for the ends when turned as above described the stop bar is returned to and remains in its normal position when the operator removes his foot from the lever 72 at the completion of the chucking operation.

In order to limit the amount of vertical movement necessary in setting the chucks the adjustable stops 83 are set to normally support the chucks at a height slightly below the positions occupied by the chucks at their lowest positions when holding end pieces.

When making boxes of greater depth than width the stop bar may be set in any fixed position by locking the quadrant 79' to the table so that when ends are thrust lengthwise between the chucks to abut against the said stop bar their centers will be located at the rear of the centers of the chucks. The chucks in this instance are normally supported by the frame 26 resting upon adjustable stops 83 at a height that will permit of them being closed to grip the ends midway of their heights thereby obviating the necessity of raising the chucks in performing the chucking operations. When the ends are gripped as above described and the first side is nailed on, the ends are turned to nail on the bottom and when the ends are turned again to nail on the opposite side the additional thickness of the first side will insure the frame 26 being supported above the stops 83 and thereby prevent the arms and chucks taking the force of the hammer blows in nailing on the last side to complete the box.

When the ends of the partially formed box are turned to nail on the last side the shorter parts of the ends are located at the rear of the chucks and they will easily clear the stop bar. The stop bar 79 can be locked in any set position by tightening a bolt 79' which is adapted to secure a quadrant 79" on the shaft 78' to the frame 21 (see Fig. 5) and adjustable stops 83 are provided for stopping the arms 30 and 31 in their downward movement at a point which will permit of end pieces of the same size being gripped correctly by the chuck members.

The vertical members of the chuck carrying frame can be fitted with collars or bosses which are adapted to rest upon adjustable stops fitted to the supporting brackets or other parts of the frame when the chuck carrying frame is lowered and those stops will limit the downward movement of the said chuck carrying frame as required.

When the end pieces A of a box are placed in the chucks and the first side is nailed into position the frame is raised to permit of the said end pieces being rotated a quarter revolution and then lowered on to the table to nail the bottom thereon after which the apparatus is again operated as above described to bring the end pieces into position for nailing on the second side to complete the box.

In the manufacture of square or rectangular boxes having four sides the chucks are automatically rotated ninety degrees when the arms supporting the said chucks are nearing the completion of their upward movement, and as the arms are lowered the end pieces of the box are retained in an upright position and placed squarely on the table for nailing on the side or bottom pieces.

Figure 7:
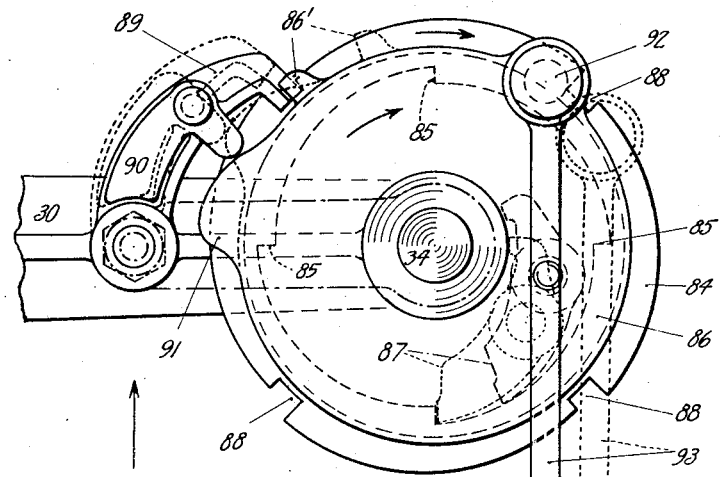
Figs. 7 and 8 are views in side elevation of the means devised for automatically turning the end pieces of a box and hereinafter are fully described.
Figure 8:
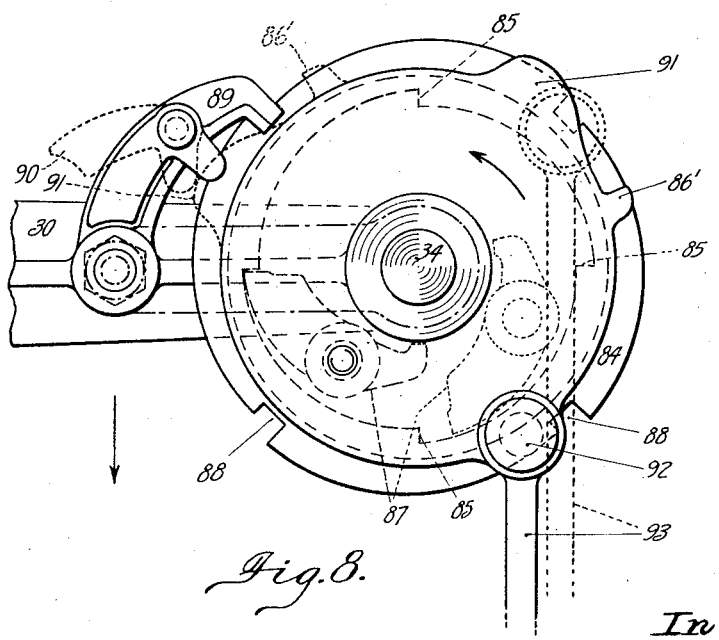

The means devised for automatically rotating the movable members of the chucks is illustrated in Figs. 7 and 8 of the drawings and comprises a disk 84 fitted to or mounted non-rotatably on the spindle 34 on the outside of the left hand fixed arm 30 and having internal ratchet teeth 85 formed in a recess in the outer face. The ratchet teeth 85 are equal in number and are spaced to correspond to the number of sides on the box to be formed, four diametrically opposed teeth being used when square or rectangular boxes are to be made on the machine.

A second disk 86 is oscillatingly mounted on the spindle 34 alongside the outer face of the ratchet disk 84 and to the inner face of the second disk is pivoted a gravity or spring actuated pawl 87 which is adapted to engage with the internal ratchet teeth 85 in the outer face of the ratchet disk.

The outer periphery of the ratchet disk 84 is provided with a plurality of spaced radial recesses 88 corresponding in number to the internal ratchets 85 and the said recesses are adapted to engage a gravity or spring actuated locking pawl 89 pivotally mounted on the fixed arm. In Figs. 3 and 9 of the drawings the pawl 89 is shown as being pressed upon the ratchet disk 84 by means of a torsional spring 89'. A tappet 90 is mounted on the gravity or spring actuated pawl 89 and this tappet lies in the path of movement of a cam shaped projection 91 on the second disk. The cam-shaped projection 91 is so disposed that the initial movement of the second disk 86 causes it to bear against the tappet 90 and move the spring or gravity operated pawl 89 out of engagement with the ratchet disk as shown in dotted lines in Fig. 7. At the completion of the initial movement of the second disk 86 the pawl 87 on the inside of the said second disk is brought into engagement with one of the internal ratchets 85 (as shown by the closely dotted lines in Fig. 7) and thereby causes the ratchet disk 84 to be rotated to the position shown in Fig. 8 or more or less as desired.

The outer face of the second disk 86 is provided with a pin or stud 92 to which is pivotally mounted one end of a rod or link 93 having its lower end passing loosely through a lug or bracket 94 on the side of the table and provided with adjustment nuts 95.

When the chuck carrying arms 30 and 31 are moved upward by depressing the foot piece 68 and are nearing the limit of their travel the nut 95 on the rod or link 93 abuts against the underside of the lug or bracket 94 on the table and the further upward movement of the said arms causes the second disk 86 to be partially rotated. The initial movement of the said disk 86 causes the cam projection 91 thereon to force the spring or gravity actuated pawl 89 to be released and the pawl 87 on the inner face of the said second disk 86 to be brought into engagement with one of the teeth of the internal ratchet 85 on the ratchet disk 84. The further upward movement of the chuck carrying arms 30 and 31 causes the two disks 84 and 86 and consequently the adjacent spiked face plate 35 to be rotated sufficiently to bring the end pieces of the box into position for nailing the next side or bottom thereon when the said end pieces are lowered to the table.

The end engaged by the spiked face plate 35 is turned positively and the opposite end is caused to rotate in unison therewith by means of the boards connecting the two ends.

The face plate or disk 37 on the spindle carried by the inner fixed arms 30 is non-rotatable and the spring pressure on the same serves to act as a brake to prevent the momentum of the end pieces when in the act of turning carrying them beyond a desired point as when heavy timber is being used to make a box, or in other words the spring pressure retains the ends at all times in correct relationship to the chucks.

When the cam shaped projection 91 passes beyond the tappet 90 the spring or gravity actuated pawl 89 is brought to bear against the periphery of the ratchet disk 84 and engages the next oncoming radial recess 88 and stops the further rotation of the said ratchet disk thereby stopping the chucks to correctly hold the end pieces in position.

The following sides of the recesses 88 are made higher than the leading sides to insure the pawl 89 readily engaging therewith and positively stopping the chuck. The amount of movement of the treadle lever 66 necessary to turn the ends correctly is determined by a stop 96 which is formed on a quadrant 97 adjustably secured to the frame by a lever-screw or bolt 98 in a like manner to the adjustable quadrant 73 for determining the limit of movement of the foot lever 72.

The second disk 86 is returned to its normal position by means of a torsional spring 99 (see Fig. 3) or weight when the chuck carrying arms 30 and 31 are being lowered to place the end pieces on the table for nailing on the next side of bottom of the box.

The cam-shaped projection 91 tilts the tappet 90 out of its way as the disk 86 is returning to its original position and the said disk is stopped by a lug 86' on its periphery striking against a projection on the spring or gravity operated pawl 89 (see Figs. 7 and 8 of the drawings).

When the spindle 34 carrying the disk of the turning mechanism is adapted to move endwise the outer end thereof is passed through the rigid supporting bracket 57 and between the bracket and the second disk may be located a torsional spring arranged as above described which is adapted to return the said disk to its normal position after each operation and to keep the said second disk bearing closely against the ratchet disk.

Figure 6:
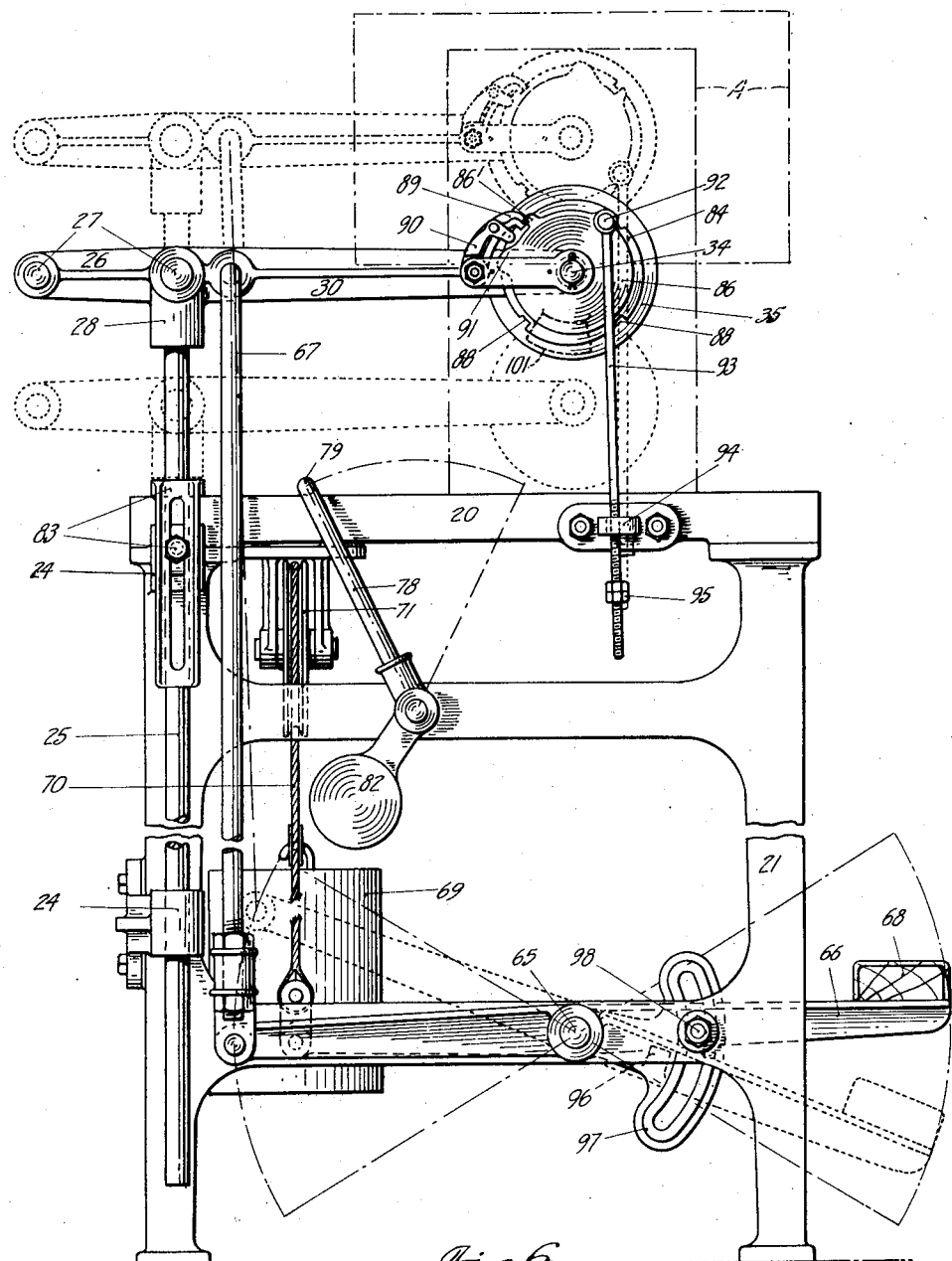
Fig 6 is a view in side elevation of the machine (viewed from the left hand side) showing in full lines the operative parts in position for supporting end pieces of a box and in dotted lines the positions taken by the parts when the partially formed box has been raised and turned.

In lieu of employing a spring as 99 to return the second disk 86 to its normal position I may use a weight 101 as shown in dotted lines in Fig. 6 of the drawings. It will be obvious that the oscillating disk 86 may be modified in shape and that a bell crank having a curved face carrying the cam-shaped projection 91 and stop 86' may be used in lieu thereof without departing from the principle underlying the construction and operation of this part of the invention.

In practice it is frequently found that the end pieces vary in length and width due to carelessness on the part of the sawyer cutting the timber and provision is made whereby the chuck carrying arms will automatically adjust themselves so that any difference in the said end pieces will not affect the correct operation of the machine. In order to permit of the chucks adapting themselves to any unevenness in the length or width of the end pieces the rear ends of both pair of arms are formed with bifurcations which loosely engage the rear horizontal member 27 of the frame 26 and set-screws 33 may be fitted to the jaws of the said bifurcations. The set screws 33 in the upper jaw of the bifurcations are loosened or removed to enable the said arms to rock slightly on the front horizontal bar 27 of the frame 26 and the set screws 33 in the lower jaws of the bifurcations normally hold the arms 30 and 31 in alinement.

In Fig. 16 of the drawings the chucks are shown gripping ends of different lengths one end being shown resting on the table while the bottom edge of the other end is indicated by a horizontal dotted line A' and is at a little distance above the table. The set screws 33 in the lower jaws of the bifurcations on the rear parts of the arms 30 and 31 are set to normally retain the said arms in horizontal alinement and sufficient play is left between the rear member 27 and the upper jaws of the bifurcations to permit of the arms adjusting themselves to the position shown in dotted lines and thereby cause the shorter end to be lowered correctly on to the table.

The provision of self adjusting means for end pieces of different lengths as above described insures both ends of a box being lowered correctly on to the table so that the force of the blows employed in nailing on the sides or bottom is not taken by and does not injure the spikes 36 or center 39 of the chuck members.

Figure 5:
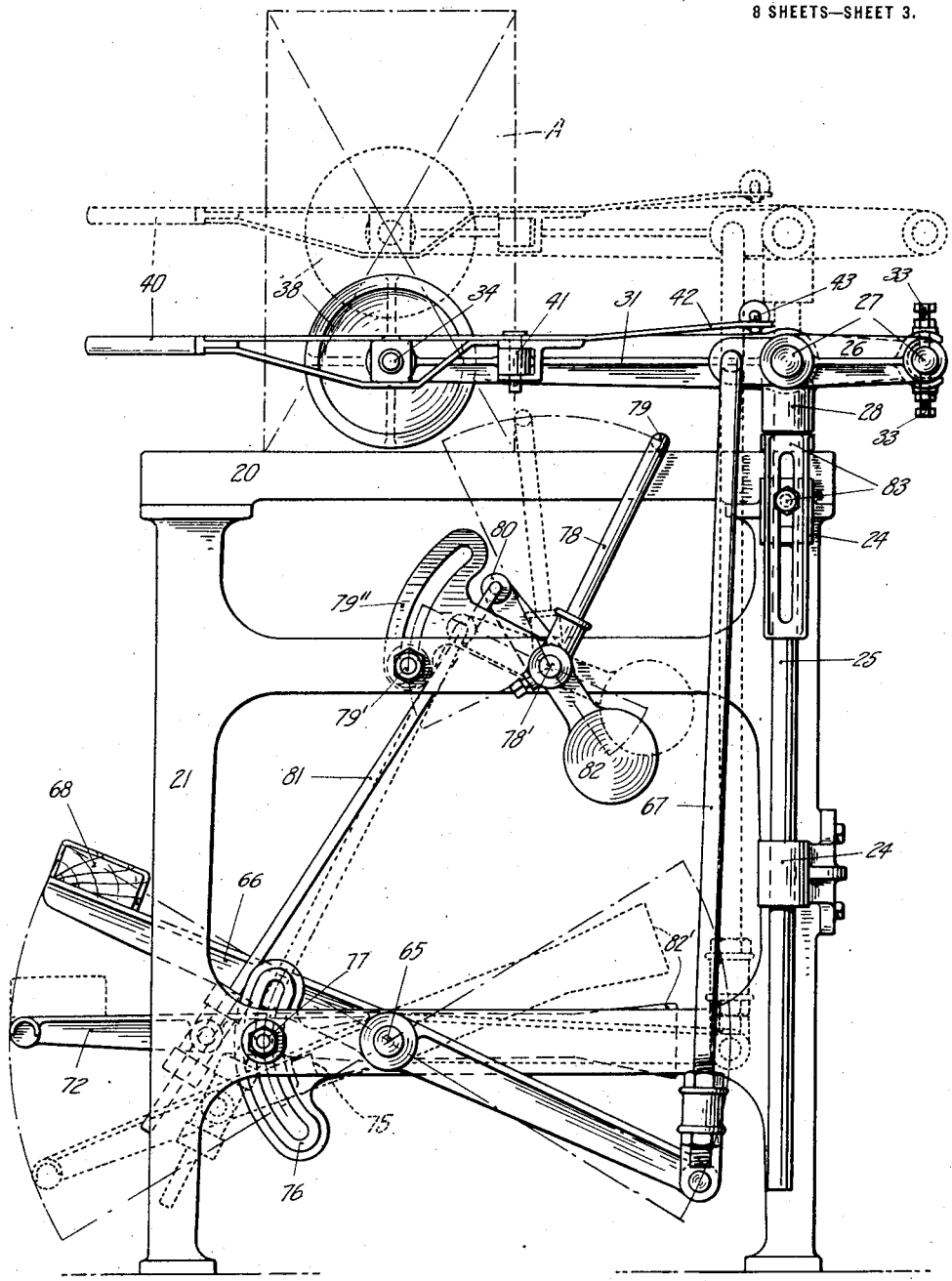
Fig. 5 is a view in side elevation of the machine (viewed from the right hand side) showing the operative parts in full lines in their normal positions and the dotted lines indicate the positions occupied by the said operative parts when they are adapted to correctly locate and support the end pieces of a box.

When the end pieces are cut exactly to the same size the arms 30 and 31 can be set in fixed positions on the frame 26 by adjusting set screws 33 in the top and bottom of the bifurcations in the rearwardly projecting parts thereof as shown in Fig. 5 of the drawings.

The face plate 35 on the arm 30 can be given a certain amount of rock or play by enlarging the recesses 88 in the ratchet disk 84 to permit of ends not cut to right angles or correctly shaped to be placed quite flat on the table. This feature of adjustment will be found useful also when any variation in the angle of the ends of a box is caused by nailing on wedge shaped boards or boards of different thicknesses.

Figure 11:
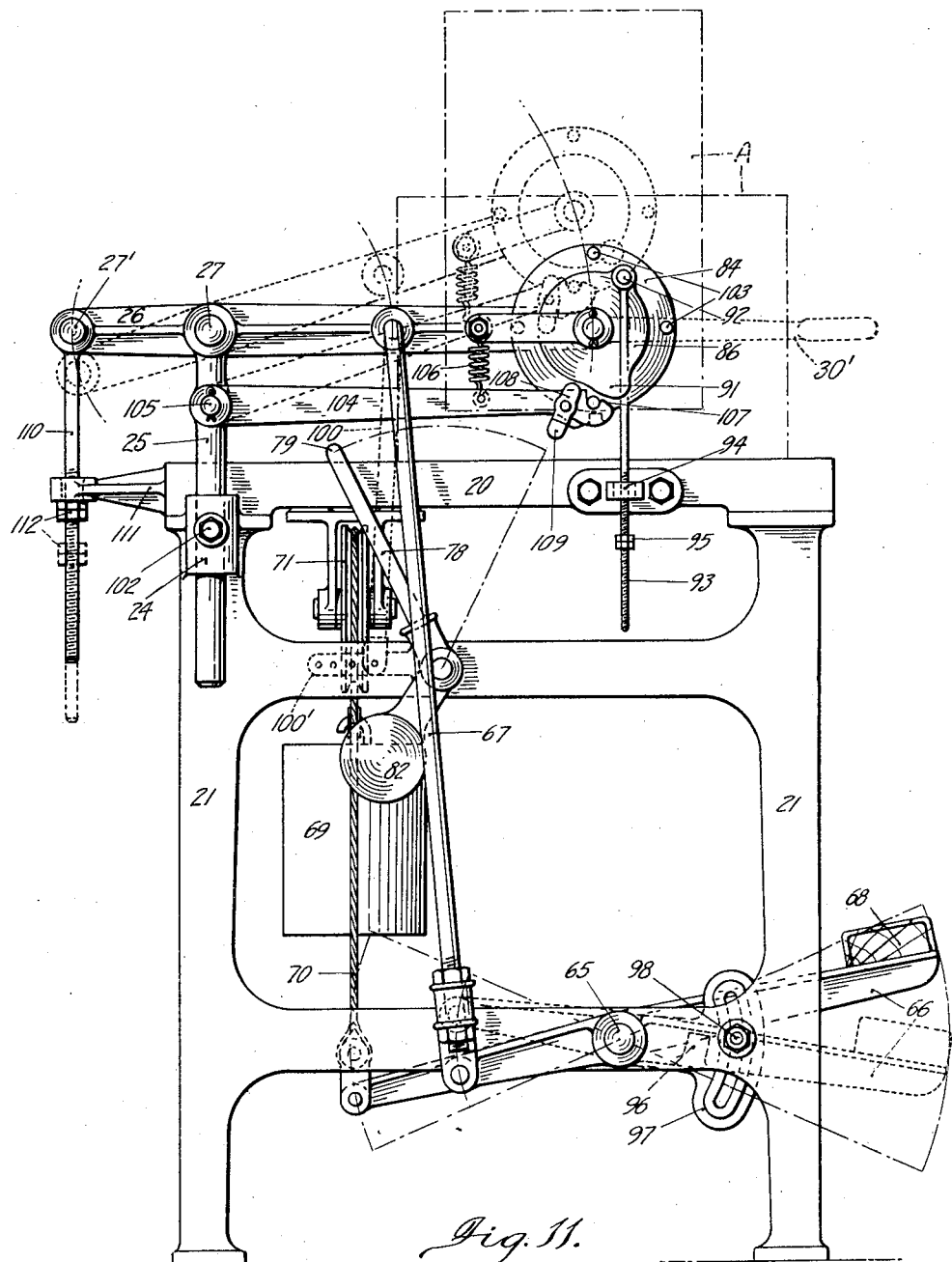
Fig. 11 is a view in side elevation of a modified form of machine showing slight alterations in the frame supporting the chucks and in the device for automatically turning the end pieces of a box.

In lieu of connecting the arms 30 and 31 rigidly to the frame so as to move up and down parallel to the table as above described they may be made to pivot with the forward horizontal member 27 passing transversely across the top of the frame which in this instance is adapted to rock in its bearings on the frame and the said frame can be adjustably secured to the table by means of set screws 102 whereby the vertical position of the said member can be regulated as desired (see Fig. 11 of the drawings).

In the modification above described the arms 30 are fixedly secured to the rocking member 27 and the second pair of arms 31 (not shown) are adjustably secured thereto so as to permit of the chucks being brought closer together or moved apart to suit the size of the box to be made on the machine.

When the arms 30 and 31 are supported on the forward horizontal member as above described the only alteration necessitated in the apparatus is in the mechanism for controlling the turning movement of the end pieces A and in the stop for regulating the amount of movement of the chucks otherwise the apparatus is constructed as hereinbefore described with reference to Figs. 1 to 9.

In this modified form of turning mechanism the periphery of the ratchet disk 84 is made quite plain and projecting from the outer face thereof are a series of regularly spaced studs 103 equal to the number of sides on a box to be made, four being shown in the drawings. The studs 103 are engaged by a pawl 104 which is pivotally mounted at 105 to the uprights 25 of the frame and is connected near its free end by a spring 106 to the outer arm 30. The distance between the pivot points of the arms 30 and the pawl 104 is equal to the distance between the centers of the lowermost stud 103 and the center of the spindle carrying the disks 84 and 86 and consequently the said arms and pawl have a parallel movement when their outer ends are raised and lowered.

The engaging end of the pawl 104 is formed with an upwardly opening jaw the outer side of which is lower than the inner side and is beveled off at 107 to permit of a stud 103 entering the same when the second disk 86 is partially rotated by the nuts 95 on the link 93 coming into contact with the abutment 94 on the side of the table when the arms 30 and 31 are nearing the limit of their upward movement.

The second disk 86 is formed with a cam-shaped projection 91 and this projection is adapted to press downwardly upon a tappet 108 on the pawl 104 and move the said pawl out of engagement with a stud 103 during the initial turning movement of the second disk. The remaining movement of the second disk causes the ratchet disk 84 to rotate one quarter of a revolution by means of the internal ratchet 85 and pawl 87 as hereinbefore described. When the chucks have been turned one quarter of a revolution and the arms 30 and 31 are being lowered to the table the second disk 86 is returned to its normal position by means of the spring 99 acting on the same. The tappet 108 tilts forwardly to permit of the cam-shaped projection 91 on the second disk to pass freely thereover when it is being returned to its normal position and the said tappet is weighted at 109 to insure it returning to its operative position after being depressed by the said cam-shaped projection.

In order to insure the chucks being raised easily by depressing the treadle 68 the connections between the rods 67 and the arms 30 are situated nearer the chucks than in that form of apparatus previously described and shown in Figs. 1 to 6 of the drawings.

The rear ends of the arms 30 and 31 are connected by a shaft 27' and from this shaft depends a pivoted rod 110 the lower end of which is screw threaded and passes through a hole in a bracket 111 fitted to the back of the table or frame supporting the same. The said pivoted rod 110 is fitted with lock nuts 112 which are adjusted thereon to limit the downward movement of the chuck or to retain them normally at a predetermined distance from the top of the table.

A machine fitted with pivoted arms as shown in Fig. 11 is operated precisely in the same manner as the machine hereinbefore described and shown in Figs. 1 to 9 of the drawings.

The rear member 27 is graduated in inches as shown by the markings 113 and the spaces so marked may be further graduated to one-sixteenth of an inch and a gage arm 114 projecting laterally from the rearwardly extending portion of the arm 31 is graduated into quarter inches, representing ends of different thicknesses such as half inch, three quarters of an inch, one inch and one inch and a quarter. By means of the graduations on the rear member 27 and the gage arm 114 the chucks can be placed readily at correct distances apart to form boxes of a predetermined inside measurement. Thus if boxes of twenty inches inside measurement having end pieces of one inch thickness are to be formed on the machine, the mark representing inch ends on the gage arm 114 is placed in line with the twenty inch mark on the said rear member 27 when the chucks will be at the correct distance apart to hold the end pieces as desired.

In order to permit the arms 31 and the chuck operating members to be adjusted correctly in position the set screw 51 securing the two parts of the connecting rod 43 and the set screw 31' securely fastening the arms 31 to the forward member 27 are released and when the said arms are placed in the required position the said screws are tightened to secure the parts in their operative positions. When the above adjustment is being effected the levers 41 and 45 and their connected parts are placed in their normal closed position and the spring 54 acts so as to keep the lock nuts 53 on the tubular part of the rod 43 against the sleeve 52 on the lever 45 so that when the set screw 51 is tightened the connecting rod will be of a desired length to insure the correct location of the chucks with respect to each other.

The lost motion provided by the loose connection between the lever 45 and the bar 43 enables the two movable chuck members 37 and 39 to adapt themselves to grip ends of different thicknesses.

When the machine is designed for use in manufacturing small boxes the chucks may be raised and lowered by raising and lowering a lever extension 30' projecting forwardly from the outer fixed arm 30 (shown in dotted lines in Fig. 11) in which case the connecting rods 67 may be disconnected from the arms 30 and 31 and the foot control means for raising and lowering the frame and setting the stop bar 79 may be dispensed with. When the foot control mechanism for raising and lowering the chucks and for adjusting the position of the stop 79 are dispensed with the outer arm 30 is connected by a link 100 to an arm 100' projecting rearwardly from the pivot points of the arms supporting the said stop bar (see dotted lines in Fig. 11). The lower end of the link 100 can be adjustably secured in any desired position to the arm 100' by means of a series of holes formed in the latter so that the stop bar will be moved over the table to a point desired to correctly locate the end pieces of a box when the said end pieces are thrust into the chucks.

When the machine is used for making boxes having one or more divisions, one or more arms 115 having spring arms 116 fitted thereto is or are detachably secured to the forward and rear horizontal members 27 of the frame 26 by means of set screws 117.

The forward end of the arm 115 supports a revoluble disk or face plate 118 and the spring arm 116 is fitted to and projects forwardly from a rear part of the arm 115 and at its forward end is bent inwardly at 119 opposite the center of the disk 118 to hold a division piece firmly against the said face plate or disk.

The face plate or disk 118 and the inwardly bent portion 119 of the spring arm are arranged in line with the chucks and operate to raise and lower the division piece in precisely the same way as the chucks 32 raise and lower the end pieces of a box.

A nail magazine 120 is supported above the table and is arranged in such a way that the operation of the chucks will cause the said magazine to be oscillated to feed nails into positions from which they can be grasped conveniently by the operator.

The support for the nail magazine comprises a rod 121 which is adjustably supported in lugs 122 on the back of the frame of the table and retained in position by means of set screws 123. The upper end of the rod 121 is bent horizontally to lie transversely above the table and pivotally mounted on this horizontal portion are brackets 124 which are secured to the underside and near the rear part of the nail magazine.

Figure 12:
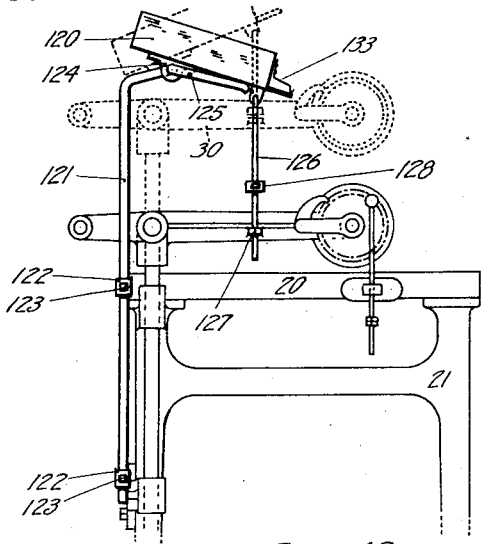
Fig. 12 is a view in side elevation of portion of the machine and shows a nail magazine operatively connected thereto.
Figure 13:
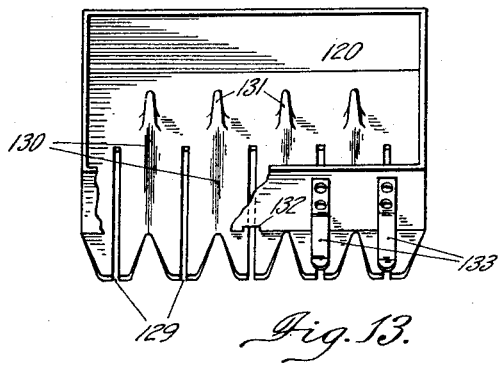
Fig. 13 is a view in front elevation of the nail magazine, part being shown broken away to clearly illustrate constructional features thereof.

The upper end of the supporting rod is bent to form a pivotal support for the magazine and also stops as 125 to limit the angular movement of the said magazine. A rod 126 is pivoted at its upper end to the underside and forward part of the magazine and the lower end of the said rod passes downwardly through a hole in a lug 127 formed on the fixed chuck carrying arms 30 of the machine. The rod 126 is provided with an adjustable collar 128 which is retained fixedly in position by a set screw and when the arms 30 are moving upwardly and downwardly to turn the end pieces of a box the said collar is brought into contact with the lug 127 thereon and oscillates the nail magazine. The collar 128 is adjusted to suit the varying heights to which the arms are raised when making boxes of different sizes; the angular movement of the magazine being constant (see Fig. 12). The nail magazine is shown in full lines in its normal position and in dotted lines in its raised position.

The nail magazine comprises an open rectangular receptacle having a number of slots 129 in the bottom extending from about its center to the front edge which projects somewhat beyond the front wall thereof. The slots in the bottom of the magazine are just sufficiently wide to permit of the shanks of the nails to pass thereinto and be supported by their heads. The slots 129 in the bottom of the magazine are formed in valleys between ridges 130 formed parallelly therewith on the bottom of the said magazine and vertical fingers 131 are formed on the said ridges near the inner ends of the said slots. The object of the said fingers 131 is to support the main body of nails while those on the surface spill over as the magazine tilts back to normal and as the nails falling into the valleys gravitate to the slots their shanks pass readily therethrough.

The front of the magazine above each nail slot is formed with a downwardly opening recess 132 which is made sufficiently large to permit of the head of a nail passing freely therethrough.

The front of the magazine is fitted with a plurality of forwardly projecting flat spring members 133 located above the nail slots 129 in the forwardly projecting portion of the bottom and the forward ends of the said spring members are bent downwardly close to the said slots to prevent the nails passing from the ends of the slots.

Figure 14:
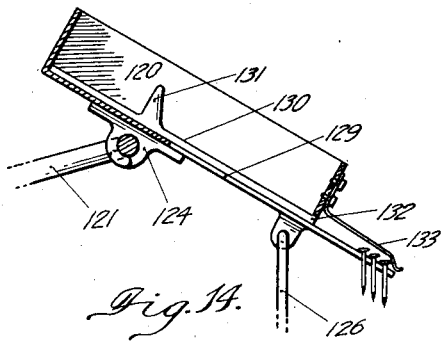
Fig. 14 is a view in sectional side elevation of the nail magazine.

The oscillation of the nail magazine causes the nails to be directed into the slots and when the front of the magazine moves downwardly the nails will gravitate down the said slots until they are stopped by the spring members as shown in Fig. 14 in which position they can be conveniently grasped by the operator.

Figure 15:
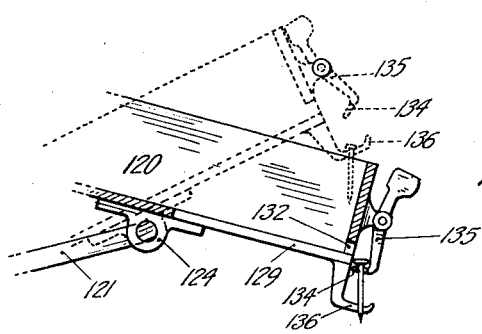
Fig. 15 is a view in sectional side elevation of portion of a modified form of nail magazine.

In Fig. 15 of the drawings I have shown a modified form of nail magazine wherein the nails as they pass from the front of the magazine on its forward movement are caught by slots or jaws 134 in a rocking member 135 supported oscillatorily on the front of the said magazine. The rearward movement of the magazine causes the slotted members 135 to oscillate and release the nails held thereby and the nails then fall and are caught by forks 136 formed in a downwardly and forwardly extending part of the bottom on the front of the said magazine. The forks 136 for supporting the nails are in line with and form extensions of the slots 129 in the bottom of the magazine and the operator may remove the nails therefrom with ease and convenience. The several parts are so constructed and arranged that only one nail can be passed to each fork 136 at a time and a second nail will not pass to the said fork until the nail previously delivered thereto has been removed.

The bottom of the magazine may be raised between the nail slots therein or it may be inclined downwardly toward both sides of each slot to facilitate the entry thereto of the shanks of the nails as hereinbefore described.

If preferred the rod 126 may be disconnected and the magazine can then be oscillated by hand as and when required to sort the nails as desired.

In operation the various parts of the machine are adjusted to suit the size of box to be made and the chucks are opened by operating the lever 41 so that when the operator depresses the foot lever 72 the stop bar will be brought into position to correctly locate end pieces thrust between the chucks and the said chucks will be in position to correctly grip the said end pieces upon the release of the pawl 55.

When the pawl 55 is released the springs acting on the chuck members force the said chuck members to engage the end pieces and the first side is nailed thereto. The operator then depresses the foot piece 68 and thereby causes the arms carrying the chucks and end pieces to be raised sufficiently to permit of the said end pieces being rotated by the turning mechanism without fouling the top of the table or the stop bar.

The nuts on the bar 93 are brought into contact with the abutment 94 prior to the chucks completing their upward movement and during the further upward movement the chucks are caused to be rotated sufficiently to place the ends in position for nailing the bottom thereon.

When the end pieces have been turned as above described the operator permits the arms to descend toward the table and the said end pieces at all times during their downward movement are retained parallel to the top of the table thereby insuring them being placed correctly in position for nailing the bottom thereon.

After the bottom has been nailed to the end pieces the chuck carrying arms are again raised to permit of the end pieces being turned to bring them into position for nailing on the next side and completing the box.

The completed box is removed from the machine by operating the lever 41 to open the chucks as hereinbefore described.

The apparatus herein described may be adapted to automatic nailing machines for supporting and correctly turning the ends of a box and any form of mechanical nailing apparatus may be used with the invention for facilitating the manufacture of boxes.

I claim—

1. In an apparatus for use in making boxes, a nailing table having a pair of vertically movable arms on both sides thereof provided with chucks for holding the ends of a box squarely on the table, a stop bar located transversely above the table, means for moving the stop bar forwardly and rearwardly across the table in line with the chucks, and means for raising the chuck carrying arms to adjust the height of the chucks and for simultaneously moving the stop bar into position for correctly determining the position of the ends of a box between the chucks.

2. In apparatus for use in making boxes a pair of vertically movable and rotatable chucks adapted to hold the end pieces, an adjustable stop for locating the end pieces on a nailing table when inserted between the chucks and means for simultaneously adjusting the relative positions of the chucks and the stop.

3. In apparatus for use in making boxes a pair of movable arms provided with intermittently rotatable chucks adapted to hold the end pieces, an adjustable stop operatively connected to the chuck carrying arms, and means for simultaneously operating the chuck carrying arms and the stop to enable the said end pieces to be readily inserted between and gripped at predetermined points by the said chucks.

4. In apparatus for use in making boxes a pair of movable arms provided with gripping chucks adapted to hold the end pieces, means for raising and lowering the chuck carrying arms, a stop bar operatively connected to the mechanism for raising and lowering the chucks, and means for independently locating the chuck carrying arms and the said stop bar.

5. In apparatus for use in making boxes a pair of arms movably supported on both sides of a table and having gripping chucks on the outer ends thereof and means for adjusting the alinement of the said gripping chucks.

6. In apparatus for use in making boxes, a pair of arms movably supported in vertical planes and fitted with rotatable chucks adapted to hold the end pieces, an adjustable stop bar for locating the end pieces on a nailing table when inserted between the chucks, and a lever and connections for simultaneously adjusting the relative positions of the chucks and the stop to enable the said end pieces to be readily inserted between and gripped at predetermined points by the said chucks.

7. In apparatus for use in making boxes, a pair of arms supported movably in vertical planes and provided with intermittently rotatable chucks adapted to hold the end pieces, an adjustable stop bar, and foot treadles adjustably connected to the chuck carrying arms and the stop bar.

8. In apparatus for use in making boxes, a pair of movable arms provided with gripping chucks adapted to hold the end pieces, treadle levers and connections for raising and lowering the chuck carrying arms, a horizontal stop bar operatively connected to a foot lever, and loose connections between the treadle levers and foot lever whereby the treadle levers can be operated to raise and lower the chuck carrying arms and the foot lever can be operated to simultaneously adjust the positions of the said chucks and the stop bar.

9. In apparatus for use in making boxes a nailing table having a pair of arms supported movably on both sides thereof, gripping chucks on the outer ends of the arms, means for adjusting the arms for retaining the chucks normally in alinement with each other, and whereby the chuck carrying arms are capable of independent movement to permit of end pieces of different lengths or widths or of irregular shape being lowered to and supported in correct position on the said table.

10. An apparatus for use in making boxes comprising a nailing table having a pair of arms movably supported on both sides thereof, chuck members supported in the outer ends of both pair of arms, a ratchet disk fitted to a spindle supporting one of the outer chuck members, a pawl on one of the chuck carrying arms adapted to normally engage the ratchet disk, an oscillating member mounted on the spindle adjacent the ratchet disk and having a pawl and ratchet engagement therewith, means for retaining the oscillating member in its normal position, means on the oscillating member for releasing the pawl holding the ratchet wheel when an initial movement is imparted to the said oscillating member by the upward movement of the frame, means whereby when the initial movement is completed the ratchet disk will be rotated more or less according to the number of sides on a box, and means for returning the oscillating member and its attached parts to their normal positions on the downward movement of the frame.

11. An apparatus for use in making boxes, comprising a nailing table having a pair of arms movably supported on both sides thereof, chuck members on the outer ends of both pair of arms adapted to support the ends of a box above the table, a rotatable spindle in one pair of arms supporting an outer chuck member having a spiked gripping face, a ratchet disk fitted to the spindle, an oscillating member mounted on the spindle adjacent the ratchet disk and having a pawl and ratchet engagement therewith, a locking pawl on one of the arms adapted to engage recesses in the periphery of the ratchet disk, a tappet on the locking pawl, a projection on the oscillating member adapted to contact with the tappet to release the locking pawl prior to the pawl and ratchet mechanism being brought into operation, an adjustable lost motion connection between the oscillating member and a fixed abutment on the table.

12. In an apparatus for use in making boxes a frame adapted to slide vertically and supporting a pair of horizontal bars, a pair of arms fitted to the bars at one side of the frame, a second pair of arms adjustably secured to the bars on the other side of the frame, loose connections between the rear ends of both pair of arms and the rear horizontal bar, gripping chucks on the forward ends of both pair of arms, and set screws on the rear end of the arms for adjusting the alinement of the gripping chucks.

13. In an apparatus for use in making boxes a vertically movable frame provided with two horizontal bars, chuck carrying arms pivotally supported on one horizontal bar and adjustably connected to the second horizontal bar of the frame, and a pair of gripping chucks on each pair of arms adapted to support the ends of a box.

14. In an apparatus for use in making boxes a vertically movable frame provided with two horizontal bars, chuck carrying arms pivotally supported on one horizontal bar of the frame, bifurcations on the rear ends of the arms engaging the second horizontal bar, and set screws on the bifurcation of the arms adapted to be adjusted to place the chuck carrying arms in alinement.

15. In an apparatus for use in making boxes the combination with a nailing table having a frame adapted to slide vertically on the rear thereof provided with a pair of horizontal bars supporting a pair of fixed and a pair of adjustable chuck carrying arms above the table, of means for setting the chuck carrying arms at correct distance apart to form boxes of predetermined inside measurements comprising graduations on one horizontal bar, and an arm projecting laterally from the adjustable pair of arms having graduations representing ends of different thicknesses.

16. In an apparatus for use in making boxes a pair of vertically movable arms, a spindle mounted rotatably in one arm, a second spindle slidably but non-rotatably mounted in the other arm, a spiked face plate on the inner end of the rotatable spindle, a yieldable disk on the inner end of the non-rotatable spindle, means for exerting an end pressure on the spindle carrying the disk, and means for imparting a partial rotation to the spiked face plate upon each vertical movement of the said arms.

17. In an apparatus for use in making boxes the combination of a nailing table having a pair of movable arms upon both sides thereof provided with chucks adapted to hold the ends of a box squarely on the table, foot levers and connections for raising and lowering the chuck carrying arms, a stop bar located transversely above the table and supported on pivoted arms, an adjustable connection between an arm projecting from the pivot point of the stop bar and a foot lever, and means for adjusting the connection whereby the stop bar will be brought forward and the chuck carrying arms will be raised to predetermined positions upon the operation of the foot lever.

18. In an apparatus for use in making boxes the combination of a nailing table having a pair of vertically movable arms on both sides thereof, chucks on the forward ends of said arms for holding the ends of a box squarely on the table, means for correctly locating the ends in the chucks comprising a stop bar located transversely above the table and having arms fitted to a shaft mounted oscillatingly below the table, an arm on the said shaft, an adjustable connection between the arm and a foot lever, an adjustable stop for limiting the movement of the foot lever, and counterbalance weights or springs for returning the stop bar and its connected parts to their normal positions when the foot lever is released.

19. In an apparatus for use in making boxes the combination with a nailing table having a pair of vertically movable arms upon both sides thereof provided with chucks adapted to hold the ends of a box squarely on the table, a pivotally mounted stop bar adapted to be moved across the table, and means for locking the stop bar in any desired position.

20. An apparatus for use in making boxes comprising a nailing table having a pair of vertically movable arms on both sides thereof provided with chucks for holding the ends of a box squarely on the table, a shaft passing transversely through the frame of the table, foot levers on the said shaft, a pair of rods connecting the foot levers to the arms, a stop bar located transversely above the table and supported on arms pivoted to a second shaft passing transversely through the frame, an arm on the second shaft, a foot lever pivoted on the first shaft, an adjustable connection between the foot lever and the arm on the second shaft, clutch connections between the levers connected to the arms and to the stops, and adjustable stops for limiting the movement of the foot levers and parts connected thereto.

21. In an apparatus for use in making boxes comprising a nailing table having a pair of vertically movable arms on both sides thereof provided with chucks for holding the ends of a box squarely on the table, a stop bar located transversely above the table, means for moving the stop bars forwardly and rearwardly across the table in line with the chucks, and means for raising the chuck carrying arms to adjust the height of the chucks and for moving the stop bar into position for correctly determining the position of the ends of a box between the chucks.

22. In an apparatus for use in making boxes the combination of a table having a pair of vertically movable arms on both sides thereof, a pair of chuck members on one pair of arms adapted to move to and from each other, one of said members being adapted to rotate and having a spiked gripping face, spring controlled levers exerting a closing pressure on said chuck members, a pair of rotatable chuck members on the second pair of arms the outer one of which is adapted to move endwise, a spring controlled lever for exerting a closing pressure in the movable chuck member on the second pair of arms, an adjustable connection between the spring controlled levers whereby they may be operated simultaneously to open and close the chuck members, means for raising and lowering the arms, and means for imparting a partial rotation to the spiked chuck member whereby the ends of a box may be turned when in their raised position to place them in position for nailing on a second side or bottom.

23. In an apparatus for use in making boxes the combination of a nailing table having a pair of movable arms on both sides thereof provided with chucks adapted to hold the ends of a box squarely on the table, a frame adjustably supporting the arms above the table, a disk fitted to one of the outer chuck members on one pair of arms, pins projecting laterally from the said disk, a pawl having one end pivoted to the frame and the opposite end engaging a pin on the disk, a spring connection between the pawl and the adjacent arm, internal ratchets on the disk, an oscillating member mounted concentrically with the disk, and having a pawl adapted to engage with the internal ratchets thereon, and an adjustable lost motion connection between the oscillating member and the table.

24. In an apparatus for use in making boxes, a vertically movable frame provided with two horizontal bars, chuck carrying arms pivotally supported on one horizontal bar and adjustably supported on the second horizontal bar of the frame, and a pair of gripping chucks on each pair of arms adapted to engage the ends of a box.

25. In apparatus for use in making boxes, a chuck for holding an end of a box comprising a rotatable gripping member and a non-rotatable yieldable disk adapted to be moved to and from the said rotatable gripping member.

26. In an apparatus for use in making boxes, the combination of a nailing table having a pair of movable arms upon both sides thereof provided with chucks adapted to hold the ends of a box squarely on the table, treadle levers and connections for raising and lowering the chuck carrying arms, a foot lever having a loose connection with the treadle levers, a stop bar located transversely above the table and supported on pivoted arms, an adjustable connection between an arm projecting from the pivot point of the stop bar and the foot lever, and means for adjusting the connection whereby the stop bar will be brought forward and the chuck carrying arms will be raised to predetermined positions upon the operation of the foot lever.

27. In an apparatus for use in making boxes, the combination of a nailing table having a pair of vertically movable arms on both sides thereof, chucks on the forward ends of said arms for holding the ends of a box squarely on the table, means for correctly locating the ends in the chucks comprising a stop bar located transversely above the table and having arms fitted to a rock shaft mounted below the table, an arm on the said rock shaft, an adjustable connection between the arm and a foot lever, an adjustable stop for limiting the movement of the foot lever, and counterbalance weights for returning the stop bar and its connected parts to their normal positions when the foot lever is released.

28. An apparatus for use in making boxes comprising a nailing table having a pair of vertically movable arms on both sides thereof provided with chucks for holding the ends of a box squarely on the table, a shaft passing transversely through the frame of the table, treadle levers on the said shaft, a pair of rods connecting the treadle levers to the arms, a stop bar located transversely above the table and supported on arms secured to a rock shaft passing transversely through the frame, an arm on the rock shaft, a foot lever pivoted on the first shaft, an adjustable connection between the foot lever and the arm on the rock shaft, clutch connections between the levers connected to the arms and the lever connected to the stop bar, and adjustable stops for limiting the movement of the treadle levers and the foot lever and parts connected thereto.

In testimony whereof I have signed my name to this specification in the presence of two subscribing witnesses.

ROBERT GEORGE CROSBIE.

Witnesses:
WILLIAM A. ASHTON,
G. E. CULLEN.